3,657,421
ANTIBIOTIC X–5108 FOR STIMULATING GROWTH

Julius Berger, Passaic, N.J., assignor to Hoffmann-La Roche Inc., Nutley, N.J.
Filed Aug. 28, 1970, Ser. No. 67,724
Int. Cl. A61k 21/00
U.S. Cl. 424—122                     5 Claims

ABSTRACT OF THE DISCLOSURE

A new antibiotic, designated as antibiotic X–5108, is produced by a new species of Styreptomyces. The new antibiotic is active against gram-positive and gram-negative bacteria and produces growth stimulation and increased feed efficiency in poultry.

DESCRIPTION OF THE INVENTION

Figure 1:
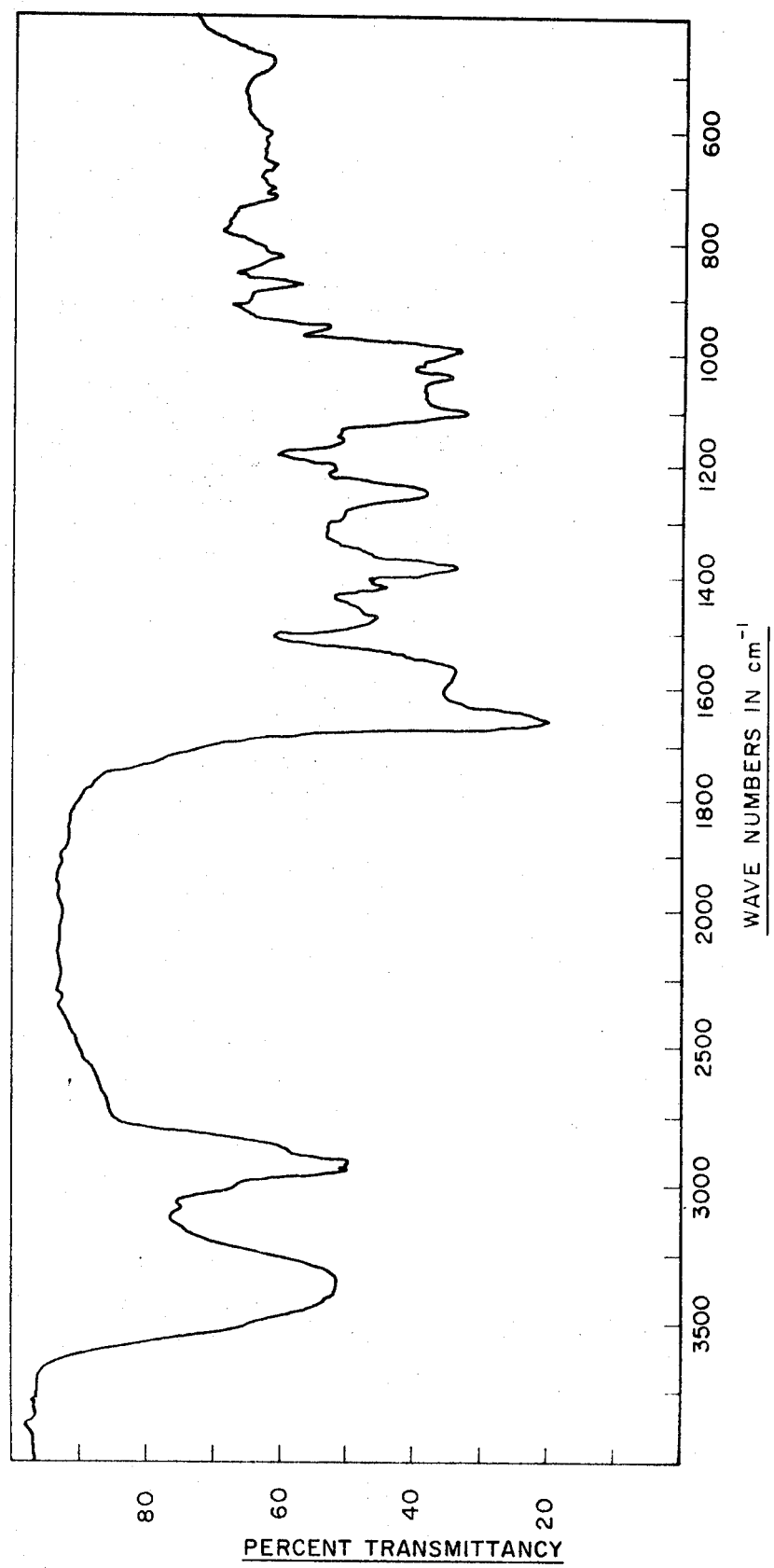

This invention relates to a new antibiotic and to methods for its production by fermentation, its isolation and purification, and its use as a growth promotant in poultry. The effects of the new antibiotic on specific bacteria in combination with its physical and chemical properties differentiate it from previously described antibiotics.

The present invention includes within its scope the antibiotic X–5108 in pure form, in dilute forms, and as a crude concentrate. The novel antibiotic whether present in a crude or in a more purified form is active against a variety of microorganisms including gram-positive and gram-negative bacteria and produces marked growth promotion in poultry.

The new antibiotic, designated hereinafter as antibiotic X–5108, is produced by a new species of Streptomyces, Streptomyces sp. X–5108. The new antibiotic-producing streptomycete was isolated from a soil sample collected in Bermuda. A viable culture of the organism labelled with the laboratory designation Streptomyces sp. X–5108, subculture 3191–2, has been deposited in the American Type Culture Collection, Rockville, Md., where this culture has been added to the ATCC collection under Registration No. 21386 and has been made available to the public. The species of Streptomyces described herein and identified as Streptomyces sp. X–5108 includes all strains of streptomyces which produce antibiotic X–5108 and which cannot be definitely differentiated from the strain ATCC 21386 and its subcultures, including mutants and variants. By the term "mutants" as used herein there is intended mutants produced from the described organism by various means such as chemical mutagenic agents, ultra-violet radiation, X–radiation, phage exposure and the like. The properties of antibiotic X–5108 are described herein and after these properties are known it is easy to differentiate the strains producing antibiotic X–5108 from others.

The following is a general description of the organism Streptomyces sp. X–5108, ATCC 21386, based upon characteristics such as amount of growth, pigment, morphology, etc. The descriptive colors and color chips designations are generally those recommended by the International Streptomyces Project (ISP): Shirling, E. B. and D. Gotttlieb, 1966, "Methods for Characterization of Streptomyces Species," Intl. J. Systematic Bact. 16: 313–340. Media used to obtain the diagnostic characteristics and the morphological description discussed below were those prepared of Difco Laboratories for the ISP; identification and content of the media are presented in Table 1.

Color names are taken from the following four sources: ISCC–NBS U.S. Department of Commerce, 1955, "The ISCC–NBS method of designating colors and a dictionary of color names," National Bureau of Standards Circular 553, U.S. Government Printing Office, Washington, D.C.; Tresner, N. D. and E. J. Backus, 1963, "System of Color Wheels for Streptomycete Taxonomy," Appl. Microb., 11: 335–338; Eckerstrom, R. and C. E. Foss, 1958, Color Harmony Manual, 4th edition, Container Corporation of America, Chicago, Ill.; H. Prauser, 1964. "Aptness and Application of Colour Codes for Exact Description of Colours of Streptomycetes," Z. Allg. Mikrobiologie, 4 (1): 95–98.

Amount of growth

The culture produces a well-developed and branched substrate mycelium and characteristic aerial mycelium on many media. The submerged growth is raised, hard and coarse, and depending on the nutrient medium employed, occurs colorless, yellow, yellow-brown or olive-brown. There are brown-black spots at the edge of the growth on yeast-malt extract agar (ISP medium 2).

Aerial mycelium and/or en masse spore color

Aerial mycelium is moderately developed, with a velvety texture and pigmented grayish-white, light (d) and medium-gray (2 fe), and yellowish gray (2 dc)) with a thin white edge at early stage of growth. Aerial mass color (Tresner-Backus Color wheel series) is Gy on ISP medium 2 to W-gy on ISP media 4 and 5. Concentric rings are produced and colony sectoring occurs frequently. The color characteristics place the culture in the Gray series (Pridham). A comparison of certain properties of Streptomyces sp. X–5108 with those of other members of the Gray series is presented in Table 2.

Morphology

Spore chains produced on aerial mycelium branch monopodially and sympodially, forming straight chains, loops, hooks, extended and irregular shot spirals (3–4 turns), also appearing in a broom-shaped arrangement. The chains are both long and short, but predominantly of more than 10 spores. Sclerotia are observed on most media. Spores are ovalelongate and cylindrical shape (phalangiform-Tresner). The spore surface is smooth, without any ornamentation as determined by electron microscopy (tomato paste agar, 10 days at 28° C.).

Physiology

Soluble pigment.—Traces of brown pigment are produced on yeast extract-malt extract agar (ISP medium 2) but not on ISP media 3, 4 and 5.

Reverse colors.—Yellow to yellow-brown plus green is produced in from 7–21 days on ISP media 2, 4 and 5. On Dr. Prauser color guide, reverse colors produced in 7 days are C 004b, Co 5m, with colorless edge (medium 2), and Co 5a, Co 5b (media 4 and 5). Addition of alkali or acid produces no change on reverse color.

Miscellaneous physiological reactions.—Culture is chromogenic (produces melanin) on peptone-iron and tyrosine agars, as well as on tryptone-yeast extract broth. A summary of certain of the cultural characteristics of Streptomyces sp. X–5108 is presented in Table 3. Nitrates are not reduced in organic nitrate broth; starch is actively hydrolyzed and gelatin is only very slightly liquified after 14 days. An indication of other miscellaneous physiological reactions of the streptomycete is found in Table 4. Carbon source utilization according to Pridham and Gottleib [J. Bact., 56, 107–114 (1948)] as follows: (11 days at 28° C.): good utilization of 1-arabinose, d-fructose, d-mannitol, 1-rhamnose, d-raffinose and sucrose; poor utilization of d-xylose, i-inositol and none of cellulose. Further information as to the carbon nitrogen utilization patterns of the streptomycete is found in Table 5. The culture grows well at 24° and 37° C., but not at 42° or 50°.

Based on spore ornamentation, general morphology of spores and the branching of sporophores, the colors en masse on various media and certain biochemical and physiological reactions, it is concluded that Streptomyces sp. X–5108 is different from any of the cultures of the Gray series described in the literature.

Cultivation of the organism Streptomyces sp. X–5108 to produce the desired antibiotic X–5108 may be carried out utilizing a variety of fermentation techniques. In general, the following basic techniques can be employed in both flask and tank procedures. In the flask fermentation, a loopful of spores from an agar slant of the culture is inoculated into 100 ml. of nutrient medium in a 500 ml. Erlenmeyer flask and incubated at about 28° C. on a rotary shaker for up to 7 days. Whole broth samples are aseptically removed for in vitro assays on the 3rd, 5th and 7th days. Likewise, for preparation of larger volumes of broth, inoculum is first prepared in 6 liter Erlenmeyer shakeflasks or in 5 gallon Pyrex bottles, fitted for aeration, sampling etc. This broth is then transferred to the tank fermentors. Aeration in bottles and tanks is provided by forcing sterile air through the fermenting medium. In tanks, further agitation is provided by mechanical impellers. Antifoam agents such as lard oil, soybean oil etc. are added as needed to control foam.

Streptomyces sp. X–5108 may be cultured in a variety of liquid culture media. Media which are especially useful for the production of the new antibiotic include an assimilable carbon source such as starch, glucose, molasses, and the like, an assimilable nitrogen source such as protein, protein hydrolysate, polypeptides, amino acids, corn steep liquor, ammonium salts, and inorganic cations and anions, such as potassium, sodium, calcium, magnesium, sulfate, phosphate, chloride etc. Trace elements such as cobalt, copper, iron, molybdenum, boron etc. are supplied as impurities of other constituents of the media.

The activity of antibiotic X–5108 can be measured in vitro by its zone of inhibition against the gram-positive bacterium Bacillus E in the usual cup-plate agar diffusion method. Alternately the gram-positive bacterium *Bacillus simplex* can be employed. Both bacteria give approximately 20 mm. inhibition zones with an arbitrarily defined 1 unit/ml. solution. In this assay method, a culture of the test microorganism is grown in nutrient broth, for example, Trypticase Soy Broth, for 24 to 42 hours at 28° C. in a rotary shaker (100 ml. medium per 500 ml. Erlenmeyer flask). An inoculum concentration of 0.25 to 0.5 percent is used to inoculate the 4 ml. seed layer which is poured over a prehardened 20 ml. of base nutrient agar layer in a 100 ml. glass or disposable plastic Petri dish. The plates are refrigerated for at least two hours before cupping and filling with test solution containing the antibiotic. The plates are then incubated at 35° C. for 18 hours and zone diameters are measured to the nearest 0.5 mm. Calculations of unit per ml. potencies are then made from standard curves.

Illustrations of the types of media that are preferably used and the antibiotic yields they support in shaken flask and in aerated tank fermentations are presented in Tables 6–9. From an examination of the data compiled in these tables, it can be seen that complex nitrogenous materials from varying sources will support antibiotic production, for example: plant materials (soybean or cottonseed flour, oatmeal, tomato pomace solids, corn fermentation solubles); animal materials (fish meal, meat meal digest, amino acid hydrolysate) and microbial cells (Torula yeast).

A number of carbon sources permit good growth and antibiotic production, for example, glucose, glycerol, dextrin and corn starch. In addition to the inorganic salts already present in natural media, supplementation with salts such as potassium phosphate, calcium carbonate, magnesium sulfate and trace elements will sometimes increase growth and antibiotic yield (depending on the constituents already present in the basal medium). One of the preferred media for production of antibiotic X–5108 in large fermenters contains 1 percent defatted cottonseed flour, 0.5 percent cornsteep liquor concentrate, 1 percent cornstarch, 0.1 percent $K_2HPO_4$ and 0.1 percent calcium carbonate.

Streptomyces sp. X–5108 will also grow well and produce antibiotic on some chemically defined synthetic media containing ammonium salts, nitrate or amino acids (glutamate, arginine, glycine) as nitrogen sources, glucose, dextrin, starch, citrate, acetate and the like as carbon sources, supplemented with salts such as potassium phosphate, calcium carbonate and magnesium sulphate, and with trace elements including $Fe^{++}$, $Cu^{++}$, $Mn^{++}$, $Co^{++}$, $Zn^{++}$. The results of fermentation of Streptomyces sp. X–5108 on various synthetic media are shown in Table 10. Generally, antibiotic yields on the synthetic media as shown in Table 10 are not as high as on complex nitrogenous media.

The production of antibiotic X–5108 is enhanced by high aeration of the fermentation medium. In addition, production of antibiotic X–5108 can be effected at any temperature conducive to the satisfactory growth of the microorganism. For example, Streptomyces sp. X–5108 was grown in shaken flasks incubated at 24°, 28°, 30°, and 32° C. Antibiotic assays after 3, 4, 5 and 6 days showed that about the same maximum yield could be obtained at any temperature from 24 to 32° C. However, the peak yield was obtained in 3–4 days at 30° and 32° while it took 4 days at 28° and 5–6 days at 24°. Ordinarily, optimum production of antibiotic X–5108 is obtained in from about 2 to 10 days. The fermentation medium normally remains fairly close to neutral, or on the acid side, during frementation. The final pH is dependent, in part, on the buffers present, and in part on the initial pH of the medium, which is preferably near neutral prior to sterilization.

After the fermentation is complete, a variety of procedures can be employed for the isolation and purification of antibiotic X–5108. Suitable isolation and purification procedures include solvent extraction techniques, such as batchwise extraction or counter-current continuous flow liquid-liquid extraction columns, and gel permeation chromatography in a non-aqueous system.

In a preferred process, antibiotic X–5108 is recovered from the culture medium by separation of the mycelium and any undissolved solids from the fermentation broth by conventional means such as by filtration or centrifugation. Antibiotic X–5108 is then extracted from the filtered or centrifuged broth using either batchwise or counter-current distribution extraction techniques. The solvent extraction may be performed using a pH range of from about 3 to about 7.5 and employing as the solvent water immiscible esters such as ethyl acetate, amyl acetate, butyl acetate and like aliphatic esters; with butyl acetate being preferred. A preferred solvent system for use with the counter-current distribution purification technique consists of a mixture of ethyl acetate, isopropanol, and 0.1 M aqueous secondary sodium phosphate solution.

Final purification of antibiotic X–5108 can be achieved by gel permeation chromatograph. This purification technique is accomplished by adsorption of pre-purified preparations of the antibiotic, for example, preparations obtained by solvent extraction techniques, on cross-linked or polymerized dextran gels. In a preferred aspect of this final purification technique, the pre-purified antibiotic preparation is chromatographed on Sephadex LH–20 eluting with alcohol.

After filtration or centrifugation of the fermentation medium, thin layer or paper chromatography techniques can be employed to analyze for antibiotic X–5108. Because of the color characteristics of the antibiotic, visualization of the spots can be achieved using the fluorescent indicator method; in addition, bioautography can also be employed advantageously. The chromatography may be carried out on paper but is preferably performed on silica gel glass plates. The solvent system employed for the thin layer chromatograms consist of chloroform, methanol and aqueous ammonium hydroxide.

The novel antibiotic of this invention, antibiotic X-5108, upon purification exists as an amorphous yellow substance. Cationic salts of the antibiotic can be formed employing the antibiotic X-5108 and a pharmaceutically acceptable inorganic or organic base. Among the salts of antibiotic X-5108 which can be formed are the alkali metal salts, such as the sodium and potassium salts, and the alkaline earth metal salts such as the calcium salt.

These salts can be formed for example using aqueous solutions of alkali metal and alkaline earth metal hydroxides. Thus solutions of antibiotic X-5108 in aqueous sodium hydroxide, aqueous potassium hydroxide or calcium hydroxide form the sodium, potassium or calcium salt. These salts can be used for the same biological purposes as the antibiotic. Since solutions of salts of antibiotic X-5108, especially the sodium salt, are considerably more stable than solutions of the antibiotic in non-salt form, it is preferable to use slightly alkaline buffers for purification by counter-current distribution and ammoniacal solvent mixtures for thin layer chromatography, thus minimizing the concentration of antibiotic in solution.

The antibiotic contains the elements carbon, hydrogen, oxygen and nitrogen in substantially the following percentages by weight:

|  | Antibiotic X-5108 | Sodium salt |
| --- | --- | --- |
| Carbon | 63.63 | 61.48 |
| Hydrogen | 7.81 | 7.81 |
| Nitrogen | 3.48 | 3.32 |
| Oxygen (by difference) | 25.08 | 24.45 |
| Sodium |  | 2.94 |

The antibiotic X-5108 is soluble in alcohols, for example, methanol, ethanol, 1- and 2-propanol, and tert-butyl alcohol; water-immiscible esters, for example, ethyl acetate, amyl acetate, butyl acetate and like aliphatic esters; and chloroform. The antibiotic is insoluble in water. The sodium salt of antibiotic X-5108 is soluble in water, lower alcohols such as methanol, ethanol, isopropanol and butanol, and N,N-dimethylformamide; is slightly soluble in amyl alcohol, tetrahydrofuran and dioxane; is very slightly soluble in acetone, amyl acetate, butyl acetate and ethyl acetate; and is insoluble in benzene, chloroform and ethyl ether.

The following are various physical characteristics of antibiotic X-5108:

The optical rotation of the sodium salt of antibiotic X-5108 is $[\alpha]_D^{25} = -82.8$ (ethanol, c.=0.52).

The infrared absorption spectrum of antibiotic X-5108 in a KBr pellet is shown in FIG. 1. The antibiotic exhibits characteristic absorption in the infrared region of the spectrum at the following wave lengths expressed in reciprocal centimeters:

Broad band at 3400
Strong band at 1660
Broad band at 1580
Prominent bands at 1580, 1380, 1250, 1100, 1040 and 995.

Figure 2:
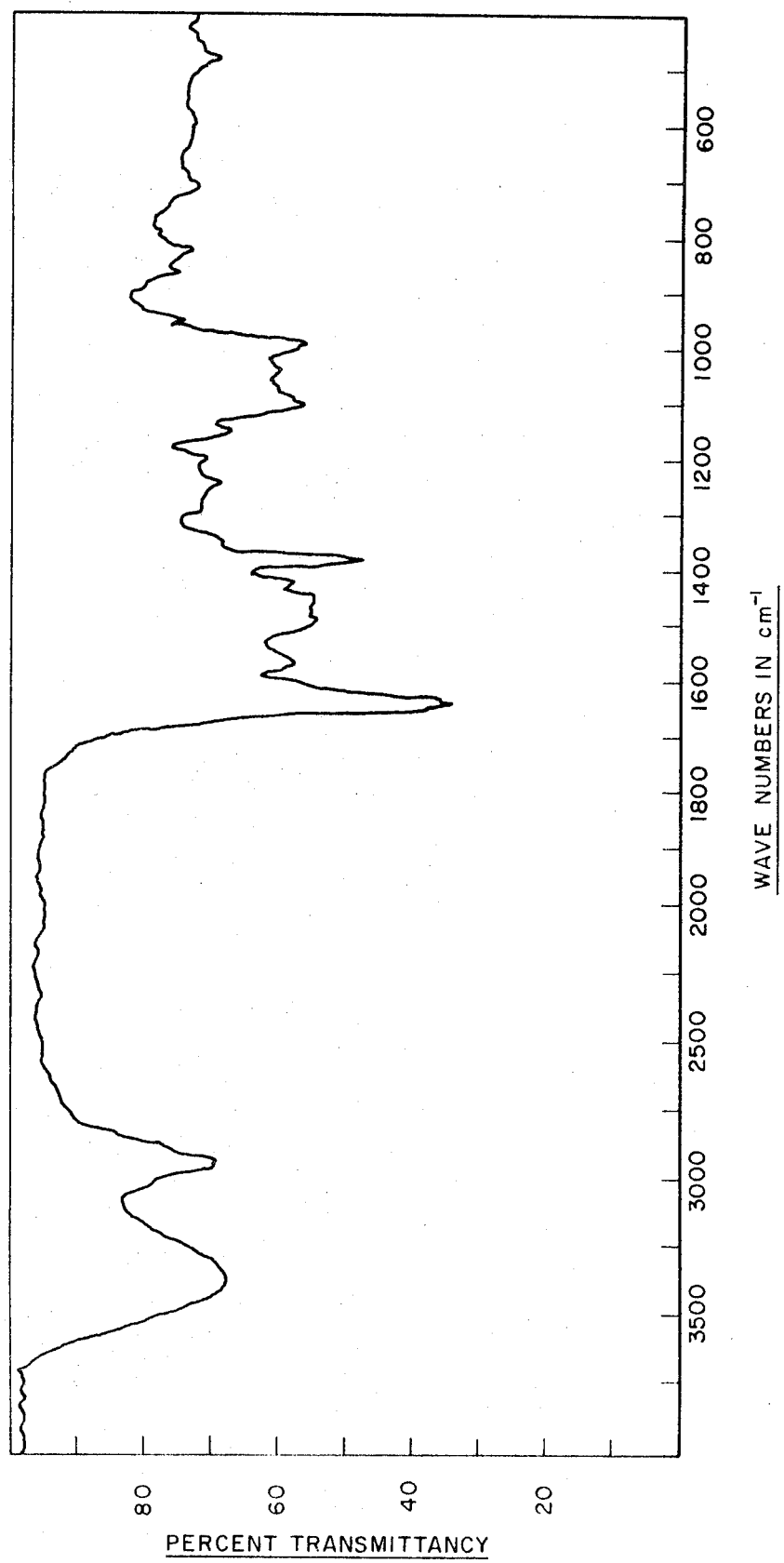

The infrared absorption spectrum of the sodium salt of antibiotic X-5108 in a KBr pellet is shown in FIG. 2. The sodium salt exhibits characteristic absorption in the infrared region of the spectrum at the following wave lengths expressed in reciprocal centimeters:

Broad band at 3400
Prominent bands at 1645, 1570, 1500, 1388, 1105 and 1000.

Figure 3:
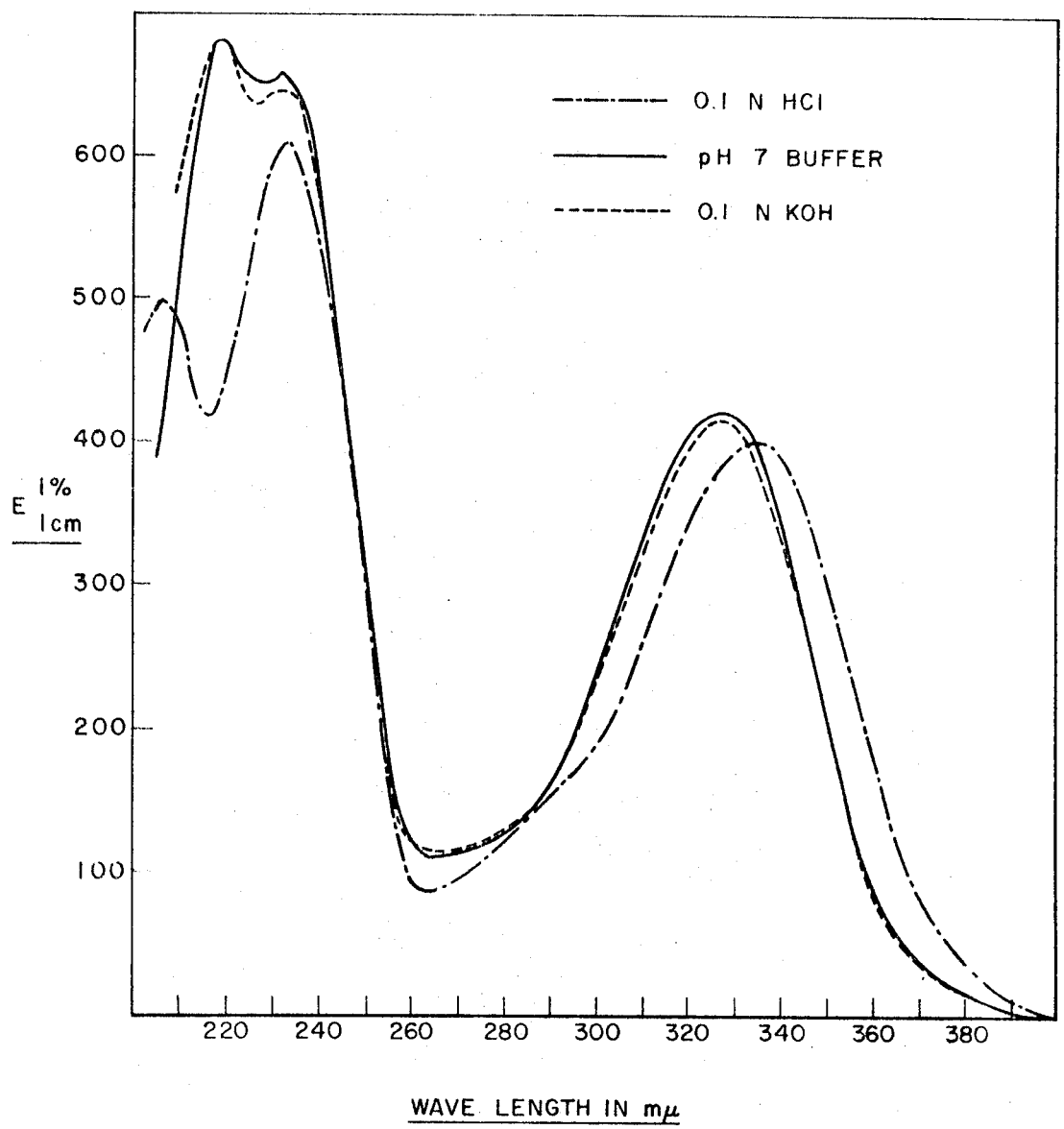

The ultra-violet absorption spectrum of antibiotic X-5108 at varying pH levels is shown in FIG. 3. Ultraviolet maxima occur at:

| 0.1 N HCL: | $\lambda_{max.}$ 334 m$\mu$ ($E_{1\,cm.}^{1\%}$=403) |
| --- | --- |
|  | $\lambda_{max.}$ 233 m$\mu$ ($E_{1\,cm.}^{1\%}$=610) |
|  | $\lambda_{max.}$ 206 m$\mu$ ($E_{1\,cm.}^{1\%}$=500) |
| pH 7 buffer: | $\lambda_{max.}$ 327 m$\mu$ ($E_{1\,cm.}^{1\%}$=423) |
| (isopropanol/K$_2$HPO$_4$) | $\lambda_{max.}$ 231 m$\mu$ ($E_{1\,cm.}^{1\%}$=660) |
| 0.1 N KOH: | $\lambda_{max.}$ 327 m$\mu$ ($E_{1\,cm.}^{1\%}$=416) |
|  | $\lambda_{max.}$ 231 m$\mu$ ($E_{1\,cm.}^{1\%}$=647) |

Figure 4:
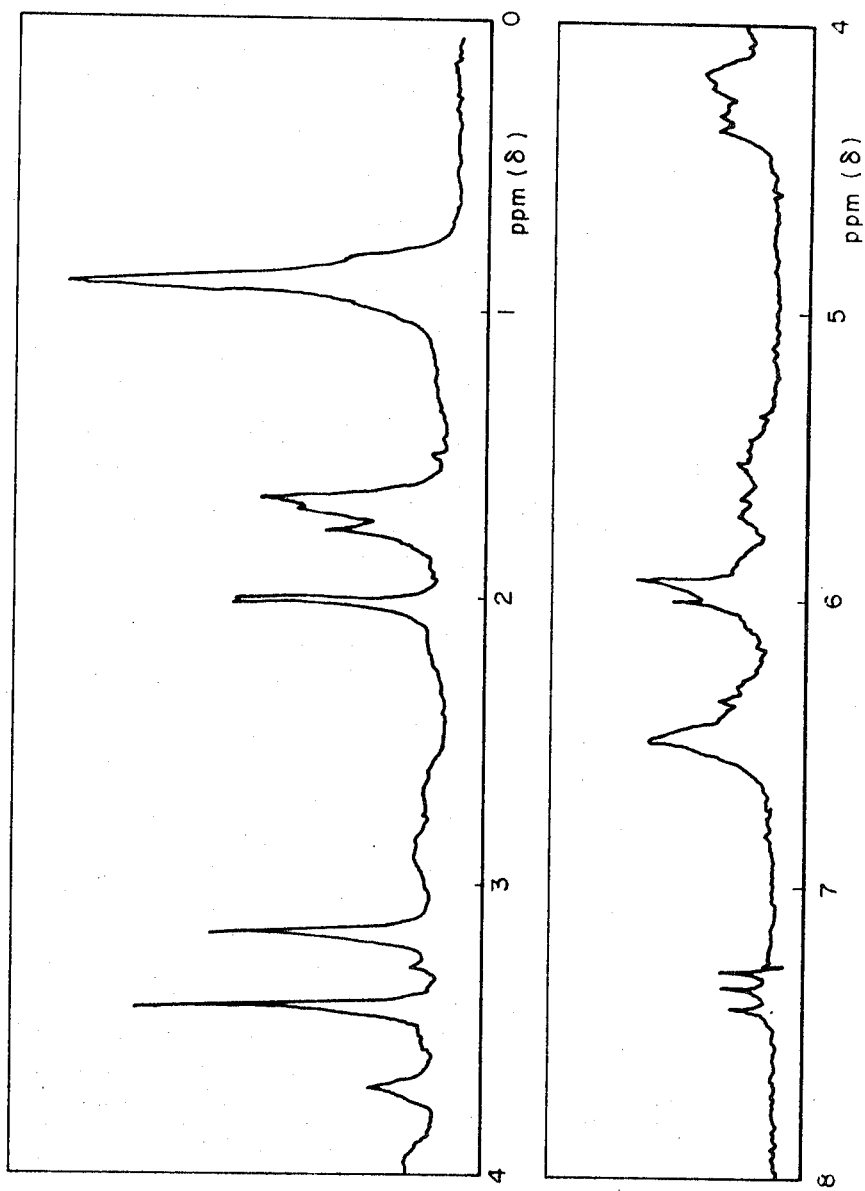

The nuclear magnetic resonance spectrum of the antibiotic X-5108 is shown in FIG. 4. The NMR spectrum was obtained using CDCl$_3$ as the solvent and tetramethylsilane (TMS) as the internal standard. The NMR spectrum exhibits prominent signals at 0.92$\delta$, in the region between 1.66 and 2.03$\delta$, at 3.16 and 3.43$\delta$ and in the olefinic region.

Antibiotic X-5108 has a broad antimicrobial spectrum as shown in Table 11. The antimicrobial spectrum was determined by employing agar diffusion cup-plate assays as described earlier.

Antibiotic X-5108 exhibits low oral and parenteral toxicity, marked antistreptococcal activity both systemically (oral route) and local (subcutaneous route), activity against pneumococcus and in caecal coccidiosis. In mice, the antibiotic is relatively atoxic orally and subcutaneously (LD$_{50}$ values=>2,000 and 1,320 mg./kg. respectively). The antibiotic is active orally (CD$_{50}$=52 mg./kg.) and subcutaneously (CD$_{50}$=44 mg./kg.) against *Streptococcus pyogenes*, is active against *Diplococcus pneumoniae* (CD$_{50}$=807 mg./kg. p.o. and 283 mg./kg. sbc), as well as against the gram-negative *Proteus vulgaris* infection.

Antibiotic X-5108 exhibits activity as a poultry growth promotant and brings about enhanced feed efficiency in the animals. Thus, in a further embodiment of the present invention, antibiotic X-5108 is employed as the active ingredient in new and useful compositions which upon oral administration to poultry result in an increased growth rate and an enhanced feed efficiency in the animals. Administration of these compositions is accomplished through the production of nutritionally balanced poultry feeds that satisfy the animals' nutrient requirements in addition to supplying the active growth promotant antibiotic X-5108.

When antibiotic X-5108 is used in the preparation of the growth promotant compositions, the antibiotic component is selected from the group consisting of the antibiotic and any pharmaceutically acceptable cationic salt thereof, preferably the sodium salt. In the discussion that follows, the term antibiotic X-5108 will be used to denote antibiotic X-5108 and its pharmaceutically acceptable cationic salts.

The growth stimulating compositions of this invention containing as the active ingredient antibiotic X-5108 are prepared by a variety of methods. Following one such method, the antibiotic is added directly to an edible nontoxic carrier. It is preferred that the carrier be a material having nutritional value for poultry; with a high energy poultry feed being the most preferred carrier. In the case where the antibiotic is added directly to the feed, the mixing step can be accomplished by employing known techniques. For example, the nutrient materials which comprise the poultry feed are fed, either individually or collectively, into a batch mixer and the antibiotic is then added. The mixer is operated until the product contains a uniform distribution of ingredients throughout.

The nutrient materials used as poultry feeds and for the purpose of this invention as carriers for the antibiotic X-5108 will vary to some extent depending upon the specific needs of the type of poultry being fed and on the final use being made of the animals. However, for the most part these feeds will contain sources of protein, such as fish meal, soybean meal, corn, peanut products and the like; and sources of carbohydrates, such as grains, meals, flours, sugars and the like. In addition, the mineral and vitamin balances for the animals can be maintained by the incorporation into the feed of the required minerals, i.e., sodium, potassium, magnesium, calcium carbonate, etc. and vitamins, i.e. vitamin A, $B_{12}$, D and thiamine. Of course, the feed may also contain other conventional feed additives.

In a preferred method of producing the growth promoting compositions of the invention, the active ingredient antibiotic X–5108 is incorporated into a concentrated pre-mix which can then be added to the poultry feed. In preparing the solid form pre-mix containing antibiotic X–5108, any suitable carrier or extender material can function as the inert ingredient provided that it be inert to the active antibiotic additive and be non-toxic to the poultry receiving the composition. Numerous solid materials satisfy these requirements and, therefore, will function successfully for the purposes of the present invention. Representative of such solid materials are mineral sources such as ground oyster shells, edible cereals, vegetable, marine or animal materials such as are present in commercial animal feeds, corn meal, citrus meal, soybean meal, fish meal, meat scraps, dried fermentation residues and the like.

Antibiotic X–5108 may be blended with one or more of the suitable solid materials discussed above into a mash, pellet, or any desired configuration by any known and convenient technique. For example, the composition can be formed by finely dividing or pulverizing the active ingredient and the inert ingredients using any commercially available grinder. If the feed material is not present when the grinding or the pulverizing is effected, the resultant material can be distributed in accordance with the present invention in any conveniently available feed material.

The quantity of antibiotic X–5108 required to achieve the desired growth rate stimulation and feed efficiency enhancement is critical, but may vary within the prescribed range. Preferably, when used in conjunction with the animal's feed supply, the improved growth promoting composition of the present invention comprises a supplemental poultry feed having dispersed therein per 100 parts by weight of feed from about 0.0001 part by weight to about 0.01 part by weight of said active material; namely, antibiotic X–5108 or pharmaceutically acceptable salts thereof. Higher concentrations of antibiotic X–5108 than 0.01 part by weight per 100 parts by weight of feed do not generally show improved results over the results obtained with 0.01 part per 100 concentration. Thus, it is not advantageous to use amounts greater than 0.01 part by weight of active ingredient per 100 parts by weight of feed. In a preferred embodiment of the invention, the novel growth promoting composition comprises a supplemental poultry feed containing per 100 parts by weight of feed, from about 0.0005 part by weight to about 0.0025 part by weight of the active ingredient antibiotic X–5108.

As indicated above, the preferred practice of the invention involves initially preparing a concentrated pre-mix containing the active ingredient antibiotic X–5108. Preparation of a pre-mix which can later be added to the feed provides a convenient method of using the growth promoting composition and insures the proper distribution of the active ingredient throughout the feed. The amount of antibiotic X–5108 present in the pre-mix is not critical to the operability of the invention. The objectives of the invention are achieved, regardless of the level of antibiotic X–5108 in the pre-mix, by utilizing a quantity of the pre-mix capable of providing a final feed containing an effective level of antibiotic X–5108 as defined above. The pre-mix is a convenient manner of supplying the composition to the feed manufacturer or poultry raiser who can then mix suitable amounts of the pre-mix with the available supply of poultry feed in order to produce a final feed containing an effective level of antibiotic X–5108.

The nature and objects of the present invention can be more fully understood by making reference to the following examples. Unless otherwise indicated all temperatures are given in degrees centigrade and all parts given are parts by weight.

EXAMPLE 1

Fermentation of Streptomyces sp. X–5108

A spore suspension of Streptomyces sp. X–5108 from a nutrient agar test tube slant was inoculated into a 5 gallon Pyrex aerated bottle containing 15 liters of medium of the following composition:

|  | Percent |
|---|---|
| Soybean flour | 1 |
| Brown sugar | 1 |
| Cornsteep solids | 0.25 |
| $K_2HPO_4$ | 0.1 |
| $CaCO_3$ | 0.1 |
| Lard oil as antifoam | 0.5 |

After four days growth at 28° C., with aeration, the filamentous growth was transferred to a 100 gallon stainless steel fermentor containing 60 gallons of medium of the following composition:

|  | Percent |
|---|---|
| Defatted cottonseed flour (Proflo) | 1 |
| Cornstarch | 1 |
| Cornsteep solids | 0.25 |
| $CaCO_3$ | 0.1 |
| $K_2HPO_4$ | 0.1 |

Lard oil as antifoam.

The pH of the medium was adjusted to 6.8 before inoculation. The tank was aerated and growth allowed to proceed for 5 days. The contents of the fermentor were then filtered off with the aid of diatomaceous earth (Hyflo Filter Cell). The filtrate was adjusted to pH 3.5 and extracted with one-half volume of butyl acetate. The clarified extract was concentrated under reduced pressure at below 40° to a brown syrup, which, after trituration with petroleum ether, yielded a solid powder, antibiotic X–5108, assaying 120 units Bacillus E per mg.

EXAMPLE 2

Purification of antibiotic X–5108 by batchwise solvent extraction

The batchwise solvent extraction process was performed on 3000 gallon fermentation batches which assayed in vitro about 130 units/ml. against B. simplex. The filtered broth was extracted with butyl acetate at pH 7.5. The organic extract, after water washes, was flash concentrated at temperatures below 50°, and to the resulting anhydrous solution was added diethyl sodiomalonate reagent to bring the pH to 9.0. The yellow precipitate that formed was filtered off and washed with butyl acetate. It was then partitioned between water-butyl acetate and the pH adjusted to 4. The organic phase was separated and treated as above, except that the diethyl sodiomalonate reagent was added to pH 8.5. This second precipitate was once again acidified and extracted with fresh butyl acetate. The extract was then treated with Darco G–60, and the sodium salt of antibiotic X–5108 was finally precipitated by addition of diethyl sodiomalonate to pH 8.0. The yellow sodium salt thus obtained, after washing and drying, assayed in vitro about 430 units/mg. against B. simplex. The above described extraction procedure is summarized in the following flow sheet.

Flow Sheet for Isolation of Antibiotic X–5108

3000 gals. of Whole Broth (5–6 day harvest)

Step 1 — Cells filtered off with aid of Hyflo 2600 gals. of Filtered Broth (pH 7.5)

Step 2 — (When necessary, pH adjusted with $H_3PO_4$)
Extracted with 600 gals. butyl acetate 570 gals. of "1st Butyl Acetate"

Step 3 — Washed twice with 25 gals. of $H_2O$
Flash concentrated 80 gals. of "1st Butyl Acetate Concentrate"

Step 4 — Added diethyl sodiomalonate reagent to pH 9 (ca. 1 to 1.5 liters of 1.7 N)
Precipitate filtered off, washed with 1 gal. of butyl acetate "1st Precipitate"

Step 5 — Dissolved in 25 gals. of $H_2O$, pH adjusted to 4 with 15 percent $H_3PO_4$;
Extracted twice with butyl acetate (20 + 10 gals.)

28 gals. of "2nd Butyl Acetate"

Step 6 — Washed twice with 2 gals. of $H_2O$
Flash concentrated 4 gals. of "2nd Butyl Acetate Concentrate"

Step 7 — Added diethyl sodiomalonate reagent to pH 8.5;
Precipitate filtered off, washed with 1 gal. of butyl acetate "2nd Precipitate"

Step 8 — Dissolved in 20 gals. of $H_2O$, pH adjusted to 5 with 15 percent $H_3PO_4$;
Extracted twice with butyl acetate (15 + 7.5 gals.)

21 gals. of "3rd Butyl Acetate"

Step 9 — Washed twice with 2 gals. of $H_2O$
Flash concentrated 4 gals. of "3rd Butyl Acetate Concentrate"

Step 10 — Stirred with 50 grams of Darco G–60 for 1 hour at room temperature,
filtered and flash concentrated 2 gals. of "4th Butyl Acetate"

Step 11 — Added diethyl sodiomalonate reagent to pH 3.0;
Precipitate filtered off, washed with 1 gal. of butyl acetate, then
1 gal. of pet. ether (30–60°), dried at 56° and 0.5 mm. for 36 hours Sodium Salt of Antibiotic X–5108 as a yellow amorphous solid

EXAMPLE 3

Purification of antibiotic X–5108 by countercurrent distribution

Instrument:
Number of tubes—200
Volume of upper phase—40 ml.
Volume of lower phase—40 ml.

Charge: 5 g. of antibiotic X–5108 obtained by solvent extraction of crude fermentation broth, dissolved in 40 ml. upper phase.

Solvent system: Ethyl acetate, isopropanol, aqueous 0.1 M secondary sodium phosphate solution, 12:9:20 v./v.

Distribution characteristics:
Number of transfers _____ 200
Peak tube after 200 transfers _____ 159
Distribution ratio _____ 3.88

Procedure: Fractions 150–170 were pooled and 1-butanol was added to extract the antibiotic into the organic phase. The aqueous phase was discarded and the organic phase washed four times with water. Finally water was removed azeotropically from the organic phase and the product precipitated by addition of petroleum ether. Three grams of the antibiotic material were recovered of biopotency approximately twice that of the starting material.

EXAMPLE 4

Purification of antibiotic X–5108 by chromatography on Sephadex LH–20

An ethanolic solution of 300 mg. of a sample of the antibiotic previously purified by countercurrent distribution was adjusted to pH 8–9 with a sodium methoxide solution (wet indicator paper) and applied to a Sephadex LH–20 column (290 x 41 mm), equilibrated with 3A alcohol. The column was developed with 3A alcohol, the major antibiotic zone emerging at an effluent volume of 950–1200 ml. Following fractions contained a number of colored zones with negligible biological activity. The active fractions were pooled and evaporated to a small volume to which ether and petroleum ether were added to precipitate the antibiotic. The resulting yellow solids, the sodium salt of antibiotic X–5108, exhibited only one spot upon tlc, $R_f$=0.19 (silica gel F–254, detection by UV light) and $R_f$=0.29 (silica gel/kieselguhr, bioautographic detection).

EXAMPLE 5

Preparation of antibiotic X–5108 from the sodium salt 0.464 g. of the sodium salt of antibiotic X–5108 obtained by chromatography on Sephadex LH–20 was dissolved in 4.6 ml. ice water and 10 ml. ethyl acetate were added to form a 2-phase system. To this mixture, contained in a separatory funnel, was added 1 ml. of primary sodium phosphate solution (50 g. of $NaH_2PO \cdot H_2O$ in 100 ml. water). The initially formed precipitate dissolved on shaking. The aqueous phase was discarded and the organic phase washed four times with one volume of ice water each and dehydrated azeotropically (ethanol). The concentrate (2 ml.) was diluted with two volumes of ethyl acetate and diethyl ether added dropwise to turbidity and finally 30 ml. petroleum ether were added. The resulting precipitate was collected by filtration and dried at room temperature to yield antibiotic X–5108.

EXAMPLE 6

Measurement of the growth stimulating effects of antibiotic X–5108

A basal ration was prepared containing the following named ingredients in the quantities hereinafter indicated:

| | Percent by weight |
|---|---|
| Ground yellow corn | 56.075 |
| Meat and bone meal (50% protein) | 4.000 |
| Fish meal (60% protein) | 4.000 |
| Soybean meal (50% protein) | 28.000 |
| Dehydrated alfalfa meal | 1.000 |
| Animal fat | 4.000 |
| Methionine | 0.200 |
| Rock phosphate | 0.250 |
| Calcium carbonate | 1.200 |
| Iodized salt | 0.250 |
| Vitamin supplement | 1.000 |
| Trace mineral supplement | 0.025 |

Antibiotic X–5108 was added to this ration in a ratio of 50 milligrams of antibiotic per kilogram of ration.

The growth stimulating effects of antibiotic X–5108 were determined by allowing poultry to feed, ad libitum, on the antibiotic supplemented ration. In the test, one day old Cornish Cross Sexed Broiler Chicks were used. The test utilized 10 chicks per replicate (5 males and 5 females). The replicate groups were permitted access to the ration. A planned random distribution of the replicates was made to equalize factors of heating, light and position. The birds were observed over a two week period, with group weight being determined several times during the period and individual weights being determined at the end of 14 days. Feed consumption was also recorded and improvement in feed efficiency, as compared to the control, was calculated.

A control experiment was carried out simultaneously, in the manner described as above, except that the chicks which were used in the control test were allowed to feed, ad libitum, on a ration which contained the same nutrient ingredients but did not contain the antibiotic X–5108 additive.

The average gain for each test group is divided by the average gain of the negative control group and the quotient multiplied by 100 to yield the percent weight gain. Gain is the final body weight of the chick at the end of the 2 week test minus the beginning weight of 1 day of age.

$$\frac{\text{(Av. final wt.} - \text{av. initial wt. of test group)}}{\text{(Av. final wt.} - \text{av. initial wt. of control group)}} \times 100 = \text{percent wt. gain}$$

Table 12 which follows summarizes the results of the experiment.

TABLE 12

| Supplement | Antibiotic supplement mg./kg. feed | Two-week gain,[1] g.±2SE[2] | Percent gain | Feed efficiency | Percent improved feed efficiency |
|---|---|---|---|---|---|
| Basal control | 0 | 154±8 | 100 | 1.55 | |
| Antibiotic X–5108 | 50 | 185±12 | 120 | 1.39 | +12 |

[1] Average for 40 chicks.
[2] Standard error of the mean.

TABLE 13

| Supplement | Level fed, mg./kg. | No. of birds | Two-week gain, g. | Percent gain | Feed eff. | Percent improved feed eff. |
|---|---|---|---|---|---|---|
| Basal control | | 48 | 149 | 100 | 1.54 | |
| Antibiotic X–5108 | 50 | 24 | 175 | 117 | 1.37 | +12 |
| Basal control | | 30 | 152 | 100 | 1.47 | |
| Antibiotic X–5108 | 50 | 18 | 173 | 114 | 1.38 | +7 |
| Basal control | | 30 | 146 | 100 | 1.59 | |
| Antibiotic X–5108 | 25 | 18 | 180 | 123 | 1.37 | +16 |
| Basal control | | 48 | 149 | 100 | 1.51 | |
| Antibiotic X–5108 | | 18 | 183 | 123 | 1.39 | +9 |
| Basal control | | 48 | 149 | 100 | 1.54 | |
| Antibiotic X–5108 | 10 | 18 | 185 | 124 | 1.41 | +13 |
| Basal control | | 48 | 149 | 100 | 1.54 | |
| Antibiotic X–5108 | 100 | 18 | 182 | 122 | 1.33 | +14 |

From the foregoing table, it is seen that the chickens fed on the ration supplemented with 50 mg. of antibiotic X–5108 per kilogram of feed experienced an increased growth rate as compared to the control. At the same time, as indicated by a 10 percent improvement in feed efficiency, the same birds made more effective use of their feed.

EXAMPLE 7

The experiment described in Example 5, including the control, was repeated several times using the same basal ration as in Example 5. In these trials the level of antibiotic X–5108 was varied. The trial chickens were fed on supplemented feed rations containing the active ingredient in a ratio of 5, 10, 25, 50 and 100 mg. per kg. of feed. These trials were repeated to confirm the results. In the control test four replicates of ten birds were allowed to feed on a basal ration devoid of the antibiotic supplement. In all tests, growth rate over a two week period was observed in comparison to the control group. Feed consumption was also recorded and improvements in feed efficiency in comparison to the control were calculated. Table 13 records the results of this series of experiments.

TABLE 1.—ISP GROWTH MEDIA

Medium 1.—Tryptone—yeast extract broth:

Bacto-Tryptone (Difco)—5.0 g.
Bacto-Yeast Extract (Difco)—3.0 g.
Distilled water—1.0 liter
pH 7.0 to 7.2, before autoclaving Dispense 5 ml. of broth into test tubes with a diameter of 20 mm. or more.

Medium 2.—Yeast extract—malt extract agar:

Bacto-Yeast Extract (Difco)—4.0 g.
Bacto-Malt Extract (Difco)—10.0 g.
Bacto-Dextrose (Difco)—4.0 g.
Distilled water—1.0 liter Adjust to pH 7.3, then add
Bacto Agar—20.0 g.
Liquify agar by steaming at 100° C. for 15–20 minutes.

Dispense appropriate amount for slanting into at least 6 tubes for each culture. Sterilize by autoclaving; cool tubes as slants.

Medium 3.—Oatmeal agar:

Oatmeal—20 g.
Agar—18.0 g.

Cook or steam 20 g. oatmeal in 1000 ml. distilled water for 20 minutes.
Filter through cheese cloth.
Add distilled water to restore volume of filtrate to 1000 ml.
Add trace salts solution—1.0 ml. solution of 0.1 g. of each of $FeSO_4 \cdot 7H_2O$, $MnCl_2 \cdot 4H_2O$ and $ZnSO_4 \cdot 7H_2O$ in 100 ml. distilled water.
Adjust to pH 7.2 with NaOH.
Add 18 g. agar; liquify by steaming at 100° C. for 15–20 minutes.

Medium 4.—Inorganic salts—starch agar:

Solution I: Difco soluble starch 10.0 g. Make a paste of the starch with a small amount of cold distilled water and bring to a volume of 500 ml.

Solution II:

$K_2HPO_4$ (anhydrous basis)—1.0 g.
$MgSO_4 \cdot 7H_2O$—1.0 g.
NaCl—1.0 g.
$(NH_4)_2SO_4$—2.0 g.
$CaCO_3$—2.0 g.
Distilled water—500 ml.

Trace salts solution—1.0 ml. of solution as in Medium 3.
pH should be between 7.0 and 7.4. Do not adjust if it is within this range.
Mix starch suspension and salts solution.
Add agar (Difco)—20.0 g.
Liquify agar by steaming at 100° C. for 15–20 minutes.

Medium 5.—Glycerol—asparagine agar:

L-Asparagine (anhydrous basis)—1.0 g.
Glycerol—10.0 g.
$K_2HPO_4$ (anhydrous basis)—1.0 g.
Distilled water—1.0 liter
Trace salts solution—1.0 ml. of solution as in medium 3

The pH of this solution is about 7.0–7.4.
Do not adjust if it is within this range.
Agar—200.0 g.
Liquify agar by steaming at 100° C. for 15–20 minutes.

Medium 6.—Peptone—yeast extract iron agar:

Bacto-Peptone Iron Agar, dehydrate (Difco)—36.0 g.
Bacto-Yeast Extract (Difco)—1.0 g.
Distilled water—1.0 liter.

pH should be 7.0–7.2 before autoclaving; adjust if necessary.
Liquify agar by steaming at 100° C. for 15–20 minutes.

Medium 7.—Tyrosine agar:

Glycerol—15.0 g.
L-Tyrosine (Difco)—0.5 g.
L-Asparagine (Difco)—1.0 g.
$K_2HPO_4$ (anhydrous basis)—0.5 g.

Medium 7.—Tyrosine agar—Continued $MgSO_4 \cdot 7H_2O$—0.5 g.
NaCl—0.5 g.

Sterilize at 15 lbs. pressure for 30 minutes
pH adjusted=6.9

TABLE 2.—COMPARISON OF PROPERTIES OF STREPTOMYCES X-5108, AND OTHER MEMBERS OF THE GRAY SERIES

| Property [1] | Streptomyces X-5108 | S. antibioticus Pfizer 15784-1 | S. aureofaciens Lederle A-377 | S. griseoluteus Umezawa | S. purpureofuscus Waksman | S. viridifaciens | S. sp. Rivett and Peters No. 11 |
|---|---|---|---|---|---|---|---|
| Spore surface | Sm | Sm | Sm | Sm | Sm | Sm | Sm. |
| Morphology | RA | RA | RA | RA | RA | RA | RA. |
| Color | Gy | Gy | Gy | Gy | Gy | Gy | Gy. |
| Melanin production | + | + | − | − | + | − | +. |
| Antibiotic production | X-5108 | Oleandomycin | Chlortetracycline | Griseolutein | Anti-trichomonas | Tetracycline | Streptolin. |
| Carbon source: | | | | | | | |
| Glucose | + | + | + | + | + | + | +. |
| d-Xylose | + | + | + | + | + | + | +. |
| l-Arabinose | + | + | + | − | + | − | +. |
| l-Rhamnose | + | + | + | − | + | − | +. |
| d-Fructose | + | + | + | + | − | + | −. |
| d-Raffinose | + | − | − | − | − | − | −. |
| d-Mannitol | + | − | − | + | − | − | −. |
| i-Inositol | + | − | − | − | − | − | −. |
| Salicin | Not done | − | − | − | − | − | −. |
| Galactose | + | + | + | + | + | + | +. |

[1] Data on cultures other than Streptomyces X-5108 were taken from the literature.

Note.—Sm=smooth on electron microscope; RA=retinaculum-apertum; Gy=Gray series; +=growth; −=no utilization.

TABLE 3.—CULTURAL CHARACTERISTICS OF STREPTOMYCES SP. X-5108

[Incubation: 14 days. Temperature: 28° C.]

| Medium (solid) [1] | Amount of Growth | Aerial mycelium and/or spores | Soluble pigment | Reverse color |
|---|---|---|---|---|
| Czapek's sucrose agar | Good | Aer. myc. whitish spor. good, white | Sl. dk. br | Sl. yellow. |
| Asparagine-dextrose, 0.25% | do.[2] | Aer. myc. fuzzy to powdery, white, becoming smoke gray sporulated | None | Orange to pinard yellow. |
| Tomato paste-peptone agar | do | Aer. myc. white to lt. gray; spor. good, gray | do | Orange buff. |
| Starch agar | do | Sporulation good, turning smoke-gray, white edge | do | Orange yellow. |
| Krainsky's glucose agar | do | Aer. myc. white; spor. good, turning smoke-gray | do | Lemon-yellow. |
| Mycophil agar (BBL) | do | No sporulation | Sl. dk | Sl. yellow. |
| Yeast extract-nutrient agar | do | do | Dk | Grayish to yellow-br. |
| Glycerol agar | Fair to good [3] | Wet, cream-colored | None | Sl. yellow. |
| Potato plug | Good | Unsporulated | Black | |
| Carrot plug | do | do | | |

[1] Growth was also good on all of the following liquid media: tryptone broth (dk. sol. pigm.; negative indole 3 days), FDA nutrient broth, Czapek sucrose broth, Krainsky glucose broth and calcium citrate-glycerol broth.
[2] Growth was good in 8 days on this medium at temperatures of 24°, 28°, 32°, and 37°, but nor at 42° C.
[3] 10 days.

TABLE 4.—PHYSIOLOGICAL REACTIONS OF STREPTOMYCES SP. X-5108

| Medium | Incubation period, days | Amount of growth | Physiological reaction |
|---|---|---|---|
| Organic nitrate broth | 8 | Moderate, unspor | No nitrate reduction, no gas. |
| Do | 13 | Good; dk. pigm | Do. |
| Gelatin (15%) at 18° C | 5 | Fair; dk. sol. pigm | No gelatin liquefaction. |
| Do | 12 | Fair to good gr; br.-blk. pigm.; unspor | Slight liquefaction. |
| Peptone-iron agar (Kligler) | 14 | Good; sporulation v. slight | Chromogenic (melanin produced). |
| Litmus milk | 6 | Fair surface growth | Litmus color unchanged; no curdling or clearing. |
| Do | 13 | Fair surface growth unsporulated | Color sl. brownish; no curdling or clearing. |
| Dorset egg agar | 3 | Good; sl. white sporulation | |
| Do | 10 | Very good growth; mostly sporulated, lt. gray | Slight dk. pigment. |

$FeSO_4 \cdot 7H_2O$—0.01 g.
Distilled water—1.0 liter
Trace salts solution of solution as in medium 3—1.0 ml.
Adjust to pH 7.2–7.4
Bacto-Agar—20.0 g.
Liquify by steaming at 100° C. for 15–20 minutes.

Trace salts solution (use as directed in media 3, 4, 5, and 7):

$FeSO_4 \cdot 7H_2O$—0.1 g.
$MnCl_2 \cdot 4H_2O$—0.1 g.
$ZnSO_4 \cdot 7H_2O$—0.1 g.
Distilled water—100.0 ml.

Tomato paste agar (Berger):

Glucose—10.0 g.
$K_2HPO_4$—1.0 g.
Tomato paste—20.0 g.
Wilson's peptone—1.0 g.
$CaCO_3$—2.0 g.
Agar—15.0 g.
Tap water—1,000.0 ml.

TABLE 5.—CARBON AND NITROGEN SOURCE UTILIZATION PATTERNS OF STREPTOMYCES SP. X-5108

[Incubation: 14 days. Temperature: 28° C.]

| Carbon source | Utilization [1] | Carbon source | Utilization [1] |
|---|---|---|---|
| l-Arabinose | 1 | Acetate | 3 |
| l-Rhamnose | 3 | Citrate | 2 |
| d-Xylose | 3 | Malate | 2 |
| d-Mannitol | 3 | Oxalate | 2 |
| i-Inositol | 3 | Salicylate | 1 |
| Glucose | 3 | Succinate | 2 |
| Fructose | 3 | Tartrate | 0 |
| Sucrose | 3 | Phenol (0.1%) | 0 |
| Raffinose | 3 | | |
| Starch | 0–1 | Nitrogen source | |
| d-Ribose | 3 | | |
| d-Galactose | 3 | $(NH_4)_2SO_4$ | 1 |
| d-Mannose | 3 | $NaNO_3$ | 1 |
| Cellobiose | 3 | Na nitrite | 1 |
| Lactose | 3 | Acetamide | 1 |
| Maltose | 3 | Asparagine | 3 |
| Dextrin | 0 | Tyrosine | 3 |
| Dulcitol | 0 | dl-Trypto-phane | 2 |
| Erythritol | 0 | Negative control | 0–1 |
| Sorbitol | 1 | | |
| Glycerol | 0–1 | | |

[1] 3 = good utilization, 2 = fair utilization, 1 = poor utilization, 0 = no utilization. Negative control, no carbon gave 0.

Distilled water spore suspensions were used for inoculations and were taken from tomato agar slants. The utilization of carbon and nitrogen compounds was tested on the following basal medium:

$KH_2PO_4$—2.38 g.
$K_2HPO_4$—5.65 g.
$MgSO_4 \cdot 7H_2O$—1.00 g.
$CuSO_4 \cdot 5H_2O$—0.0064 g.
$FeSO_4 \cdot 7H_2O$—0.0011 g.
$MnCl_2 \cdot 4H_2O$—0.0079 g.
$ZnSO_4 \cdot 7H_2O$—0.0015 g.
Agar—15 g.
Distilled water—1 liter
Medium adjusted to pH 6.8—7.0.

To test carbon sources on this basal medium, 2.64 g. per liter of $(NH_4)_2SO_4$ was added as the common nitrogen source; the carbon sources were added at a 1% concentration level, except for the sodium salts of the organic acids which were used at 0.15% level. To test nitrogen sources, the synthetic agar basal plus 1% starch plus nitrogen source at a concentration of 0.1 g. nitrogen per liter was used.

All media contained 0.1% $K_2HPO_4$ and 0.1% $CaCO_3$, unless otherwise mentioned. One ml. of spore suspension of Streptomypces sp. X-5108 was inoculated into each 100 ml. medium.

TABLE 8.—EFFECT OF NUTRIENT VARIATIONS ON ANTIBIOTIC YIELD BY STREPTOMYCES X-5108 IN SHAKE FLASKS AND AERATED KETTLES

[Unless otherwise indicated, each medium contained 0.5% $CaCO_3$ and 0.1% $K_2HOP_4$]

| Item | Composition of the medium, percent | | | | Antibiotic yields, B. simplex units per ml. | |
|---|---|---|---|---|---|---|
| | Tomato pomace solids | Distiller's solubles | Corn-starch | Glucose | Flasks, 7 days | Tanks, 6 days (duplicate runs) |
| 1 | 1 | 1 | 1 | 0.5 | 150 | 100, 120 |
| 2 | 2 | 0 | 1 | 0.5 | 100 | 71, 46 |
| 3 | 0 | 2 | 1 | 0.5 | 91 | 88, 119 |
| 4 | 1 | 1 | 1.5 | 0 | 140 | 150, 124 |
| 5 | 1 | 1 | 0 | 1.5 | 180 | 125, 126 |
| 6 | 1 | 1 | 0 | 0 | 54 | [1] |
| 7 | [2]1 | [3]1 | [4]0.1 | [5]0.1 | 94 | [6]97 |

[1] Not done.  [2] Proflo.  [3] Starch.  [4] $CaCO_3$.  [5] $K_2HPO_4$.  [6] 4 days.

TABLE 6.—EFFECT OF NUTRIENT VARIATIONS ON ANTIBIOTIC YIELD BY STREPTOMYCES sp. X-5108 IN SHAKE FLASKS

[All media contained 1% dextrin, 0.1% $K_2HPO_4$ and 0.1% $CaCO_3$. One ml. of spore suspension of Streptomyces sp. X-5108 was inoculated into each 100 ml. of medium]

| Experiment number | All nitrogen sources added at 1% levels except 17 and 23 (2%) | Age in days | Antibiotic potency in E units per ml. |
|---|---|---|---|
| 1 | Meat Meal digest | 6 | 50 |
| 2 | BY-100 (Commercial Solvents Corp.) | 5 | 45 |
| 3 | Proflo (Traders Oil Mill Co.) | 5 | 23 |
| 4 | Oatmeal (Quaker Oats Co.) | 5 | 32 |
| 5 | Soyalose (defatted soybean flour) | 5 | 30 |
| 8 | Protein peanut meal | 5 | 41 |
| 9 | Protein coconut meal | 5 | 50 |
| 10 | Tomato pomace solids | 5 | 57 |
| 11 | Linseed oil meal | 5 | 37 |
| 12 | Cornmeal | 5 | 33 |
| 13 | Corn distillers dried grain with solubles (H. Walker) | 5 | 74 |
| 14 | Soludri (Schenley Distillers) | 5 | 51 |
| 15 | Fishmeal (Gorton's) | 5 | 25 |
| 16 | Fish scraps (Wilkinson) | 5 | 16 |
| 17 | Milk sugar-albumin mix | 5 | 50 |
| 19 | Dried Torula yeast | 5 | 38 |
| 20 | National Yeast Autolysate | 5 | 16 |
| 21 | Soy enzyme hydrolysate | 5 | 33 |
| 22 | Wheat protein acid hydrolysate (Huron Mills) | 5 | 12 |
| 23 | Homogenized condensed fish | 5 | 27 |
| 24 | Protopeptone #366 (Wilson Labs) | 5 | 18 |
| 25 | Cornsteep solids | 5 | 26 |

TABLE 9.—TANK FERMENTATIONS WITH VARIOUS MEDIA

| Experiment number [a] | Composition of medium in percent | Day of harvest | Potency in E units/ml. |
|---|---|---|---|
| K12 | 1 distillers dried solubles, 1 dextrin, 0.1 $K_2HPO_4$, 0.1 $CaCO_3$. | 6 | 67 |
| K13 | 1 Na-l-glutamate, 1 dextrin, 0.1 cornsteep solids, 0.15 $K_2HPO_4$, 0.05 $MgSO_4$. | 5 | 100 |
| K11 | 1 tomato pomace solids, 1 distillers dried solubles, 1 cornstarch, 0.5 glucose, 0.5 $CaCO_3$, 0.1 $K_2HPO_4$. | 7 | 200 |
| K4 | 0.5 Proflo [b], 0.5 distillers dried solubles, 0.5 tomato pomace solids, 0.5 meat extract paste (protopeptone No. 366), 1 starch, 0.1 $CaCO_3$, 0.1 $K_2HPO_4$. | 4 | 91 |
| K16 | 1.0 Proflo [b], 0.5 cornsteep liquor, 1.0 cornstarch, 0.1 $CaCO_3$, 0.1 $K_2HPO_4$. | 4 | 260 |

[a] K11, K12 and K13 are all stainless steel 100 gallon fermentors, which were generally charged with 65 gallons of medium; K16 is a 750 gallon carbon steel fermentor (500 gal. charge) and K4 was a 4,200 gal. carbon steel fermentor (3,200 gal. charge).
[b] Proflo is a defatted cottonseed product of Traders Oil Mill Co., Fort Worth, Texas.

TABLE 7.—EFFECT OF NUTRIENT VARIATIONS ON ANTIBIOTIC YIELD BY STREPTOMYCES X-5108 IN SHAKE FLASKS

| Experiment number | Composition of medium in percent | Age in days | Antibiotic potency in E units per ml. |
|---|---|---|---|
| 1 | 1 meat meal digest, 1 dextrin | 4 | 40 |
| 2 | 1 fermentation grain residue (BY-100), 1 dextrin | 4 | 67 |
| 3 | 1 defatted cottonseed flour (Proflo), 1 dextrin | 4 | 52 |
| 4 | 1 fish scraps | 4 | 40 |
| 5 | 1 corn distiller's dried grains with solubles (H. Walker), 1 dextrin | 6 | 138 |
| 7 | (3) but no $CaCO_3$ | 4 | 19 |
| 8 | (3) but no $CaCO_3$ or $K_2HPO_4$ | 4 | 34 |
| 9 | (8) but only 0.25 Proflo | 4 | 12 |
| 10 | (8) but 2.0 Proflo | 4 | 47 |
| 11 | 1 Proflo, 1 glucose | 6 | 21 |
| 12 | 1 Proflo, 1 starch | 6 | 21 |
| 13 | 1 Proflo, 1 glycerol | 4 | 35 |
| 14 | 1 Proflo, 1 brown sugar | 4 | 14 |
| 15 | 1 Proflo, 1 maltose | 4 | 22 |
| 16 | 1 Proflo, 1 lactose | 4 | 26 |
| 17 | 1 Proflo, 1 mannitol | 6 | 2 |

TABLE 10.—PRODUCTION OF ANTIBIOTIC BY STREPTOMYCES X-5108 ON SYNTHETIC MEDIA

| Composition of medium, in percent | Age in days | Antibiotic potency in E units/ml. |
|---|---|---|
| 1.0 Na glutamate, 1 dextrin, 0.1 $K_2HPO_4$, 0.05 $MgSO_4$ | 5 | 7.6 |
| 1.0 amino acid mixture,[1] 1 dextrin, 0.1 $K_2HPO_4$, 0.1 USP salts #1 | 5 | 11.5 |
| BBL Czapek-Dox broth[2] | 5 | 4.4 |
| 1.0 Arginine, 1.0 dextrin, 0.1 $K_2HPO_4$, 0.1 $CaCO_3$, 0.05 $MgSO_4$ | 6 | 0.8 |
| 1.0 dl-aspartic acid, 1.0 dextrin, 0.1 $K_2HPO_4$, 0.1 $CaCO_3$, 0.05 $MgSO_4$ | 6 | 0.8 |
| 0.1 Na glutamate, 0.6 $(NH_4)_2HPO_4$, 1 glucose, 1 dextrin, 0.1 $K_2HPO_4$, 0.1 $CaCO_3$, 0.1 KCl, 0.05 $MgSO_4$ | 5 | 6.6 |
| 0.33 $(NH_4)_2SO_4$, 1.5 glucose, 0.1 Na citrate, 0.05 Na acetate, 0.5 NaCl, 0.025 $MgSO_4 \cdot 7H_2O$, 0.01 $K_2HPO_4$, 0.01 $KH_2PO_4$, 0.3 $CaCO_3$, 0.001 $MnSO_4 \cdot 4H_2O$, 0.004 $ZnSO_4 \cdot 7H_2O$, $1.6 \times 10^{-6}$ $K_2Cr_2O_7$ | 7 | 20 |

[1] Staley's Sta-Mino B.
[2] 3% sucrose, 0.3% $NaNO_3$, 0.1 $K_2HPO_4$, 0.05 $MgSO_4$, 0.05 KCl, 0.001 $FeSO_4$, as sold by Baltimore Biological Laboratories.

TABLE 11.—IN VITRO ANTIMICROBIAL SPECTRA OF ANTIBIOTIC X-5108

| Test organisms | Diameter of inhibition zones [1] in mm. | |
|---|---|---|
| | Crude sodium salt of antibiotic X-5108—1 mg./ml. | Pure sodium salt of antibiotic X-5108—1 mg./ml. |
| Escherichia coli | 17.3 (18) | 18.0 (18.5). |
| Paecilomyces varioti | 0 (0) | 0 (0). |
| Mycobacterium phlei | $19^{25.3}$ | $20.2^{27.5}$. |
| Bacillus simplex | $39.3^{cs}$ $(20)^2$ | $40.3^{cs}$ $(20)^2$. |
| Pseudomonas aeruginosa | 14.0 (12.5) | 15.0 (13). |
| Aerobacter aerogenes | $12.0^{17}$ (14.5) | $14.3^{19}$ (15.5). |
| Streptomyces cellulosae | 31.3 $(21)^3$ | 33.0 $(21)^3$. |
| Sarcina lutea | $27.7^{cs}$ $(21.5)^3$ | $29.7^{cs}$ $(22)^3$. |
| Bacillus E | $36.3^{cns}$ $(31)^3$ | $37.2^{cns}$ $(32)^3$. |
| Bacillus subtilis | $16.0^{22.7}$ $(17^{24})$ | $17.0^{23}$ $(17^{24})$. |
| Serratia marcescens | $14.7^{22.7}$ (22) | $15.7^{24}$ (22.5). |
| Candida albicans | Trace (0) | Trace (0). |
| Penicillium digitatum | 0 | 0. |
| Saccharomyces cerevisiae | 0 (0) | 0 (0). |
| Staphylococcus aureus | $14.5^{cs}$ (13) | $15.8^{cs}$ (14). |
| Bodenheimer's bacillus | $20.8^{cs}$ (18) | $21.7^{cs}$ (18). |
| Proteus vulgaris | $16.3^{21.2}$ $(20)^3$ | $16.7^{22.2}$ $(20)^3$. |

[1] Where there are double entries, with entry in the upper right corner, it is indicative of the presence of a secondary, hazier zone of inhibition. The abbreviations of cs and cns stand for clear and sharp, or for clear not sharp zone edges, respectively.
[2] At 0.001 mg./ml. concentration.
[3] At 0.1 mg./ml. concentration; for Bacillus E at 0.01 mg./ml., zone size was 22 mm. for J306.

I claim:
1. A composition for enhancing the feed efficiency and stimulating the growth of poultry which comprises antibiotic X-5108, a yellow amorphous substance characterized as follows:
   (a) analysis: carbon, 63.63%; hydrogen, 7.81%; nitrogen, 3.48%; oxygen, 25.08% (by difference);
   (b) soluble in methanol, ethanol, 1- and 2-propanol, tert. butyl alcohol, ethyl acetate, amyl acetate, butyl acetate and chloroform;
   (c) a characteristic infrared absorption spectrum as shown in accompanying FIG. 1;
   (d) a characteristic nuclear magnetic resonance spectrum as shown in accompanying FIG. 4;
or a pharmaceutically acceptable salt thereof, and a non-toxic inert ingredient, wherein antibiotic X-5108 or a salt thereof is present in a ratio by weight of from about 0.0001 part to about 0.01 part per 100 parts of inert ingredient.

2. The composition of claim 1 wherein said non-toxic inert ingredient is a high energy nutrient feed for poultry containing a carbohydrate source and a protein source.

3. The composition of claim 1 wherein an alkali metal salt of antibiotic X-5108 is present.

4. A composition for enhancing the feed efficiency and stimulating the growth of poultry which comprises a concentrated pre-mixture of antibiotic X-5108, said antibiotic being a yellow amorphous substance characterized as follows:
   (a) analysis: carbon, 63.63%; hydrogen, 7.71%; nitrogen, 3.48%; oxygen, 25.08% (by difference);
   (b) soluble in methanol, ethanol, 1- and 2-propanol, tert. butyl alcohol, ethyl acetate, amyl acetate, butyl acetate and chloroform;
   (c) a characteristic infrared absorption spectrum as shown in accompanying FIG. 1;
   (d) a characteristic nuclear magnetic resonance spectrum as shown in accompanying FIG. 4;
or a pharmaceutically acceptable salt thereof, and an inert, non-toxic ingredient wherein said pre-mixture upon addition to a coventional poultry feed containing a protein source and a carbohydrate source, produces a feed containing per 100 parts by weight of feed from about 0.0001 to about 0.01 part by weight of antibiotic X-5108 or a pharmaceutically acceptable salt thereof.

5. A method for stimulating the growth and enhancing the feed efficiency of poultry which comprises orally administering to poultry as their regular feed requirement a composition containing antibiotic X-5108, a yellow amorphous substance characterized as follows:
   (a) analysis: carbon, 63.63%; hydrogen, 7.81%; nitrogen, 3.48%; oxygen, 25.08% (by difference);
   (b) soluble in methanol, ethanol, 1- and 2-propanol, tert. butyl alcohol, ethyl acetate, amyl acetate, butyl acetate and chloroform;
   (c) a characteristic infrared absorption spectrum as shown in accompanying FIG. 1;
   (d) a characteristic nuclear magnetic resonance spectrum as shown in accompanying FIG. 4;
or a pharmaceutically acceptable salt thereof, and a high energy nutrient feed for poultry containing a carbohydrate source and a protein source, wherein said antibiotic X-5108 or said salt thereof is present in a ratio by weight of from about 0.0001 part to about 0.01 part of antibiotic X-5108 or a salt thereof per 100 parts feed.

References Cited

Miller: The Pfizer Handbook of Microbial Metabolites, McGraw-Hill Book Co., Inc., New York, N.Y., 1961, p. 125.

JEROME D. GOLDBERG, Primary Examiner

U.S. Cl. X.R.

424—121

PO-1050
(5/69)

UNITED STATES PATENT OFFICE
CERTIFICATE OF CORRECTION

Patent No. 3,657,421      Dated April 18, 1972

Inventor(s) Julius Berger

It is certified that error appears in the above-identified patent and that said Letters Patent are hereby corrected as shown below:

Column 1, line 12    "Styreptomyces"    should be

Streptomyces

Column 1, line 68 "those prepared of Difco" should be those prepared by Difco

Column 4, line 63 "by gel permeation chromatograph"

should be by gel permeation chromatography

Column 9, line 38 "added diethylsodiomalonate reagent to pH 3.0;"

should be added diethylsodiomalonate reagent to pH 8.0;

Signed and sealed this 23rd day of January 1973.

(SEAL)
Attest:

EDWARD M. FLETCHER, JR.              ROBERT GOTTSCHALK
Attesting Officer                     Commissioner of Patents